(12) United States Patent
Kaplan et al.

(10) Patent No.: US 9,764,593 B2
(45) Date of Patent: Sep. 19, 2017

(54) WHEEL ASSEMBLY WITH ROLLING AND SWIVELING CAPABILITY

(71) Applicant: Master Manufacturing Co., Inc., Cleveland, OH (US)

(72) Inventors: Irving Leonard Kaplan, Cypress, TX (US); Marc L. Vitantonio Vitantonio, Chagrin Falls, OH (US); Trevor L. Jackson, Kirtland, OH (US)

(73) Assignee: Master Manufacturing Co., Inc., Cleveland, OH (US)

( * ) Notice: Subject to any disclaimer, the term of this patent is extended or adjusted under 35 U.S.C. 154(b) by 0 days.

(21) Appl. No.: 15/005,041

(22) Filed: Jan. 25, 2016

(65) Prior Publication Data

US 2017/0015139 A1    Jan. 19, 2017

Related U.S. Application Data

(60) Provisional application No. 62/193,012, filed on Jul. 15, 2015, provisional application No. 62/211,047, filed on Aug. 28, 2015.

(51) Int. Cl.
*A47B 91/00* (2006.01)
*B60B 33/00* (2006.01)

(52) U.S. Cl.
CPC ........ *B60B 33/0018* (2013.01); *B60B 33/006* (2013.01); *B60B 33/0042* (2013.01);
(Continued)

(58) Field of Classification Search
CPC ............... Y10T 16/211; B60B 33/0002; B60B 33/0057; B60B 33/006; B60B 33/0065; B60B 33/0068; B60B 33/0018; B60B 33/0042; B60B 33/0049; B60B 2900/111; B60B 2900/121; B60B 2900/1212; A45C 5/143
See application file for complete search history.

(56) References Cited

U.S. PATENT DOCUMENTS 122,016 A * 12/1871 Hickok ............... B60B 33/0002
16/38
145,769 A * 12/1873 Waitt .................. B60B 33/0002
16/22

(Continued)

*Primary Examiner* — Chuck Mah
(74) *Attorney, Agent, or Firm* — Renner, Otto, Boisselle & Sklar, LLP (57) ABSTRACT

A wheel assembly having rolling and swiveling capability includes a wheel bracket configured for mounting one or more wheels, a swivel bracket configured for positioning with respect to an object with respect to which the wheel assembly is used, the swivel bracket including a main body and a spindle extending from one side of the main body of the swivel bracket into a receptacle in the wheel bracket, the spindle and receptacle being tapered at different angles to minimize surface to surface engagement during swiveling, a thrust bearing between the swivel bracket and wheel bracket to transfer force between the brackets while assisting to align the brackets, a retention mechanism at the distal end portion of the spindle configured to retain the spindle in the wheel bracket and aligning the spindle with respect to the wheel bracket while permitting the wheel bracket to swivel about the spindle relative to the swivel bracket.

19 Claims, 9 Drawing Sheets

(52) U.S. Cl.
CPC ....... *B60B 33/0049* (2013.01); *B60B 33/0068* (2013.01); *B60B 2200/20* (2013.01)

(56) References Cited

U.S. PATENT DOCUMENTS

| | | | | |
|---|---|---|---|---|
| 223,702 A * | 1/1880 | Brackebush | ........ | B60B 33/0042 16/48 |
| 344,988 A * | 7/1886 | Richmond | .......... | B60B 33/0002 16/48 |
| 553,152 A * | 1/1896 | Cole | ........................ | B60B 33/06 16/19 |
| 715,866 A * | 12/1902 | Rentschler et al. | | B60B 33/0002 16/31 R |
| 1,102,149 A * | 6/1914 | Gould | ................. | B60B 33/0002 16/21 |
| 1,344,864 A * | 6/1920 | Chesnutt | ............. | B60B 33/0002 16/21 |
| 1,532,033 A * | 3/1925 | Bowen | ................ | B60B 33/0002 16/21 |
| 1,582,598 A * | 4/1926 | Hancock | ............. | B60B 33/0002 16/21 |
| 1,711,723 A * | 5/1929 | Cousins | .............. | B60B 33/0002 16/22 |
| 2,437,588 A * | 3/1948 | Baum | ................. | B60B 33/0002 16/20 |
| 2,790,649 A * | 4/1957 | Lubbe | ...................... | B41J 29/06 16/48 |
| 3,283,358 A * | 11/1966 | Merriam | ............. | B60B 33/0002 16/18 R |
| 3,433,500 A * | 3/1969 | Christensen | ............ | B60B 33/00 16/47 |
| 3,861,703 A * | 1/1975 | Gould | .................... | A45C 5/143 190/18 A |
| 4,342,134 A * | 8/1982 | Mickelson | .......... | B60B 33/0002 16/31 R |
| 4,772,035 A * | 9/1988 | Danial | ................ | B60B 33/0002 16/30 |
| 5,136,751 A | 8/1992 | Coyne et al. | | |
| 5,199,131 A * | 4/1993 | Harris | .................... | B60B 33/00 16/18 R |
| 5,634,240 A | 6/1997 | Brokaw | | |
| 6,592,133 B2 * | 7/2003 | Powell | .................... | A45C 5/143 16/30 |
| 8,904,598 B2 * | 12/2014 | Waitz | ....................... | A45C 5/14 16/20 |

* cited by examiner

WHEEL ASSEMBLY WITH ROLLING AND SWIVELING CAPABILITY

PRIORITY CLAIM AND CROSS REFERENCE TO RELATED APPLICATION

The benefit of U.S. Provisional Patent Application No. 62/193,012 filed Jul. 15, 2015, and of U.S. Provisional Patent Application No. 62/211,047, filed Aug. 28, 2015, is claimed, the entire disclosures of such applications are incorporated by this reference.

TECHNICAL FIELD

The present disclosure is directed to wheel assemblies capable of rolling and swiveling, and, more particularly, to such wheel assemblies that easily can be fastened to an article for use therewith.

BACKGROUND

A caster wheel assembly provides support and mobility for various articles, such as, for example, furniture and other articles such as storage boxes, file cabinets, book shelves, etc.

Wheel assemblies that may be adhesively secured to an article are disclosed in U.S. Pat. No. 5,136,751 and U.S. Pat. No. 5,634,240. Other types of wheel assemblies may be secured to an article by inserting a caster stem, sometimes called a pintle, into a mounting socket in the article. The wheel(s) section of the wheel assembly may roll and in some wheel assemblies the wheel(s) section may swivel about the caster stem. Other types of wheel assemblies may be secured to an article by screws or nails.

As an example, in U.S. Pat. No. 5,136,751 a caster wheel assembly includes a mounting plate to which a wheel is attached by an axle and adhesive structure that adhesively secures the mounting plate to a surface of an article. As an example, the axle may be generally parallel to a surface along which the wheel may roll in a generally linear direction, e.g., "back and forth," as the wheel rotates about the axle. Examples of articles to which the caster wheel assembly may be attached include wooden, plastic, cardboard or metal storage cabinets, tool chests, bookshelves, trash cans, other furniture, luggage and so on.

As another example in U.S. Pat. No. 5,634,240 a caster wheel component is able to swivel so that the luggage or other article to which it is attached is able to roll in different directions. A wheel structure rotatably supports a wheel for rotation about an axle; and the wheel structure is supported from a metal base plate by means of a roller bearing structure permitting the wheel structure to swivel relative to the base plate, which is coupled to the luggage or other article.

SUMMARY

It would be desirable for a wheel assembly to be able to roll and to swivel, to be of a small number of easily made parts and to be attachable to various articles to permit rolling in different directions.

The present disclosure relates to a wheel assembly that has both rolling and swiveling capability. In an embodiment the wheel assembly may be conveniently reproducibly made using injection molding techniques, e.g., plastic injection molding techniques. In an embodiment the wheel assembly may conveniently be adhered to an article by adhesive, and with one or more wheel assemblies adhered to an article, the article may be conveniently selectively moved in various directions, e.g., forward, backward, sideways, diagonally, end so on.

According to an aspect of this disclosure, a wheel assembly includes a wheel bracket configured for mounting one or more wheels with respect thereto, a swivel bracket configured for positioning with respect to an object with respect to which the wheel assembly is used, the swivel bracket including a main body and a spindle extending from one side of the main body of the swivel bracket, the spindle having a proximal end portion and a distal end portion, the proximal end portion relatively proximate (at/extending from) the main body of the swivel bracket and the distal end portion being remote from the main body relative to the proximal end portion, the spindle configured to extend into the wheel bracket, and a retention mechanism at the distal end portion of the spindle configured to retain the spindle in the wheel bracket while permitting the wheel bracket to swivel about the spindle relative to the swivel bracket.

According to another aspect, a swivelable wheel assembly, includes a swivel bracket and a wheel bracket configured to mount at least one wheel thereon, the swivel bracket and the wheel bracket being coupled to each other for swiveling of one relative to the other, the swivel bracket including an extending member having at least a portion that is generally tapering truncated conical shape, the wheel bracket having a receptacle that is of gradually tapering truncated conical shape different from that of the member and is configured to receive at least part of the member, whereby corresponding portions of the member and receptacle are in closer fitting relation than corresponding other parts of the member and receptacle to tend to minimize frictional resistance to swiveling of the respective brackets relative to each other.

According to another aspect, a swivelable wheel assembly, includes a swivel bracket having a support base and an extending spindle, the spindle having a generally round cross section and a portion that is tapered from a relatively wider cross section toward a relatively narrower cross section from an area nearer the support base toward an area nearer the distal end of the spindle, and a wheel bracket having a receptacle extending in a direction and having an open area to receive at least part of the spindle, the open area of the receptacle that receives the spindle having a generally round cross section that is tapered from a relatively wider cross section near an entrance to receive the spindle into the open area toward a relatively narrower cross section portion, wherein the angle of taper of the receptacle is different from the angle of taper of the spindle reducing surface to surface engagement of the received spindle part and the receptacle with the spindle in the receptacle, and wherein the swivel bracket and the wheel bracket are swivelable with respect to each other with the spindle in the receptacle.

According to another aspect, a swivelable wheel assembly, includes a wheel bracket configured to support at least one wheel, a swivel bracket configured to support the wheel bracket, the swivel bracket including a base and an elongate spindle extending from the base, the elongate spindle having a generally circular cross section portion at least part of which is tapered from a relatively wider cross section toward a relatively narrower cross section remote from the base, the wheel bracket including a body having an elongate receptacle space therein to receive at least part of the elongate spindle, the receptacle space having a generally circular cross section portion at least part of which is tapered from a relatively wider cross section at the entrance to the elongate receptacle space where the elongate spindle is received in the elongate receptacle space toward the interior of the elongate receptacle away from the entrance, the angle of taper of the elongate spindle being sharper than the angle of taper of the elongate receptacle space as to tend to minimize surface contact between the tapered part of the elongate spindle and a wall of the elongate receptacle space adjacent the tapered part of the elongate spindle inserted in the elongate receptacle space, a retainer configured to retain the elongate spindle in the elongate receptacle space, and wherein a wall portion of the elongate spindle and a wall portion of the base of the swivel bracket engage each other to hold in relative position.

According to another aspect, a swivelable wheel assembly, includes a swivel bracket having a support base and an extending spindle, the spindle having a generally round cross section and a portion that is tapered from a relatively wider cross section toward a relatively narrower cross section from an area nearer the support base toward an area nearer the distal end of the spindle, and a wheel bracket having a receptacle extending in a direction and having an open area to receive at least part of the spindle, the open area of the receptacle that receives the spindle having a generally round cross section that is tapered from a relatively wider cross section near an entrance to receive the spindle into the open area toward a relatively narrower cross section portion, and wherein the swivel bracket and the wheel bracket are swivelable with respect to each other with the spindle in the receptacle, a retainer configured to retain the elongate spindle in the elongate receptacle space while limiting axial movement of the spindle and receptacle with respect to each other to tend to avoid surface to surface engagement of respective surfaces of the spindle and receptacle.

These and other aspects of the present disclosure will be clear with reference to the following description and drawings, in which the specific embodiments of the present disclosure are detailedly disclosed to indicate some ways for implementing the principle of the present disclosure. However, it shall be appreciated that the scope of the present disclosure is not limited thereto. On the contrary, the present disclosure includes any change, modification and equivalent falling within the scope of the spirit and the connotation of the accompanied claims.

Features that are described and/or illustrated with respect to one embodiment may be used in the same or similar way in one or more other embodiments, and/or used by being combined with or replacing the features of other embodiments.

Various aspects of the present disclosure can be better understood with reference to the following drawings. The components in the drawings are not necessarily drafted to scale, and the emphasis is laid upon clearly illustrating principles of the present disclosure. For the convenience of illustrating and describing some parts of the present disclosure, corresponding parts in the drawings may be enlarged in size, e.g., enlarged to be larger than the case in the exemplary device actually made according to the present disclosure, relative to other parts. Components and features depicted in one drawing or embodiment of the present disclosure may be combined with components and features depicted in one or more additional drawings or embodiments. Moreover, in the drawings, the same reference signs designate corresponding parts throughout the drawings and may be used to designate the same or similar parts in at least one embodiment.

DESCRIPTION

Figure 1:
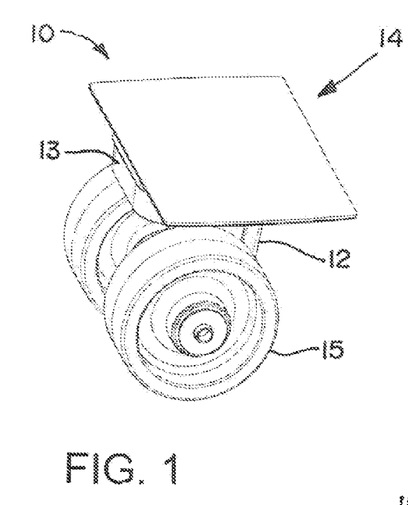
FIG. 1 is a perspective view of a wheel assembly looking angularly from the top side.
Figure 2:
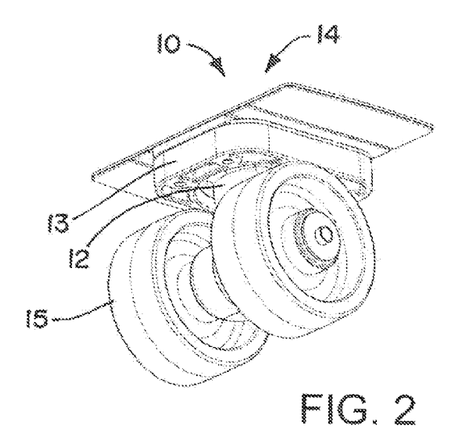
FIG. 2 is a perspective view of a wheel assembly looking angularly from the bottom side.
Figure 3:
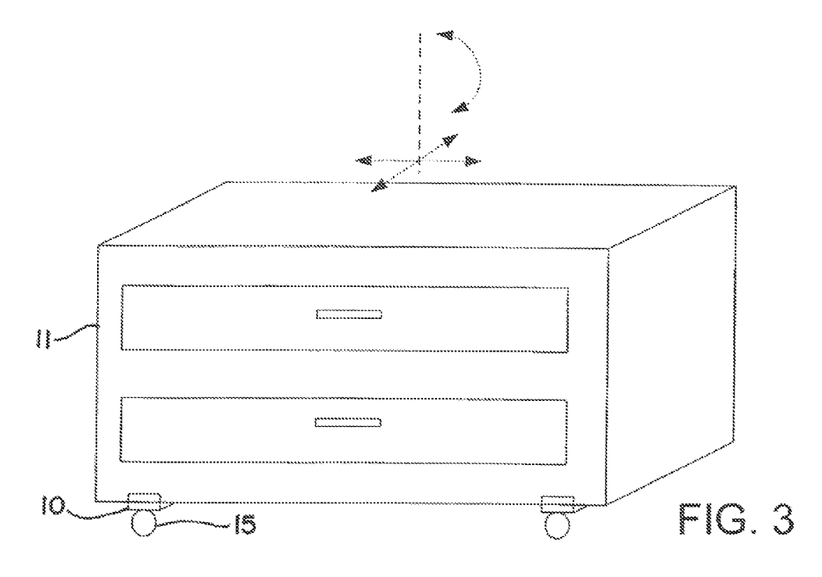
FIG. 3 is a perspective view of an article to which several wheel assemblies are attached to facilitate moving the article in several directions.

Referring, now, to FIGS. 1-3 of the drawings, a wheel assembly 10 is illustrated. In FIG. 3 several wheel assemblies are illustrated attached to an article or object, e.g., a file cabinet 11. The wheel assemblies are seen in FIG. 3 attached at two of the four corners of the cabinet; however, there may also be wheel assemblies, which are not seen in FIG. 3, attached at the other two corners of the cabinet. With wheel assemblies supporting the cabinet at its four corners, the cabinet may be moved, e.g., rolled, in various directions, e.g., forward, backward, sideways, diagonally, and so on. The wheel assembly sometimes may be referred to as a caster. The wheel assemblies are able to roll along a support surface, e.g., a floor, and also to swivel to provide for such movement of the cabinet or other article that is supported by the wheel assemblies.

Turning to FIGS. 1-9, the wheel assembly 10 includes a wheel bracket 12, a swivel bracket 13 and a mounting structure 14. The mounting structure 14 is configured to have "stick on" capability, whereby the wheel assembly may be attached to an article 11 using adhesive. For example, as is described below, the mounting structure 14 may include an adhesive bracket, which is referred to below by reference numeral 60, and adhesive on the adhesive bracket. Other attachment mechanisms may be used as the mounting structure, such as using screw, nail or other fasteners to attach the wheel assembly to an article.

The wheel bracket 12, which also is illustrated in FIGS. 10-14, is configured for mounting one or more wheels 15 with respect thereto. In the illustrated embodiment the wheel assembly 10 includes two wheels 15. The swivel bracket 13, which also is illustrated in FIGS. 15-18, includes a spindle 16 with which the swivel bracket is coupled to the wheel bracket 12 so that the wheel bracket and the swivel bracket may swivel with respect to each other, e.g., rotate or spin around each other The swivel bracket also is configured for positioning with respect to an article with respect to which the wheel assembly is used, e.g., the cabinet 11. Moreover, the mounting structure 14 is coupled to the swivel bracket 13 to attach the wheel assembly 10 to the article 11 with respect to which the wheel assembly is used.

Figures 4, 5:
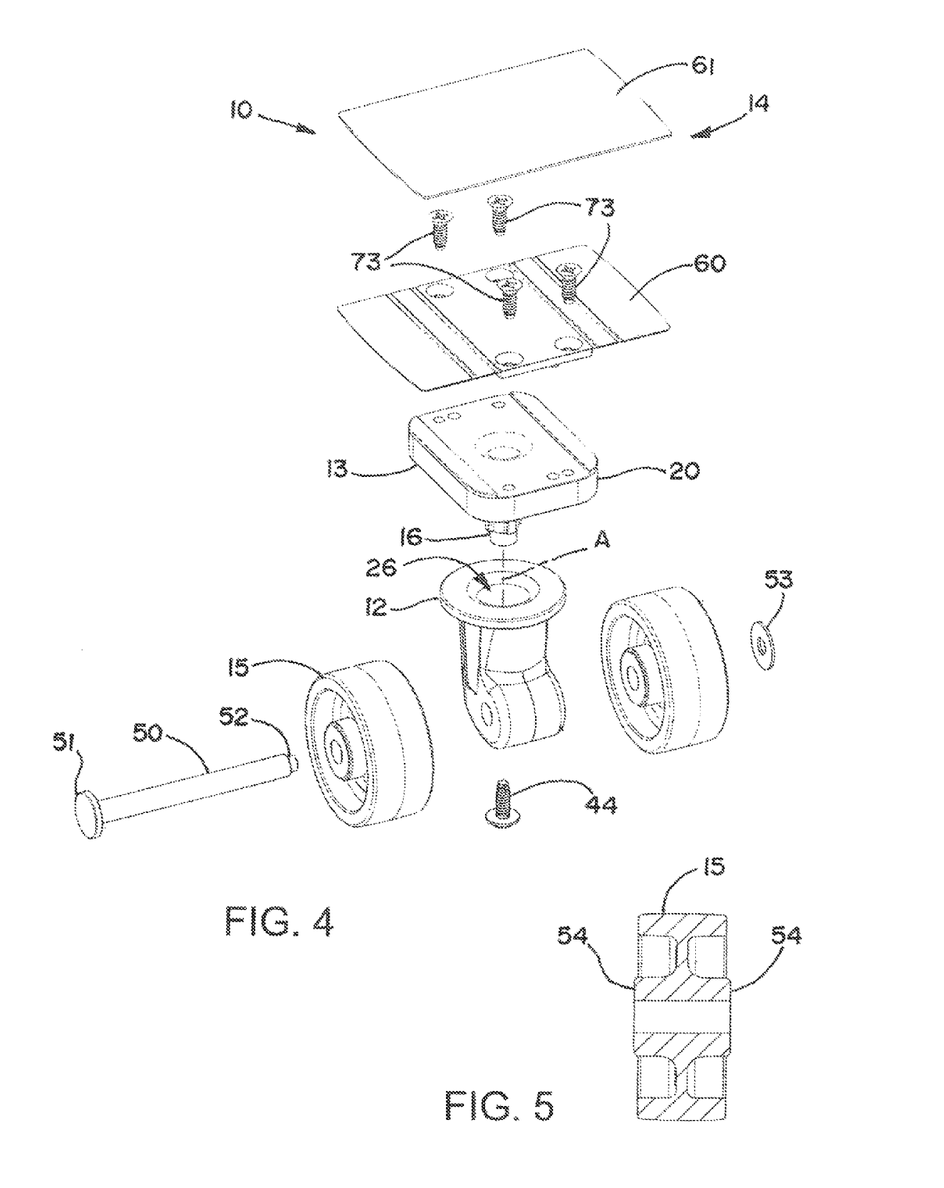
FIG. 4 is an exploded perspective view of a wheel assembly.
FIG. 5 is a cross section view of a wheel of the wheel assembly of FIG. 4.
Figure 6:
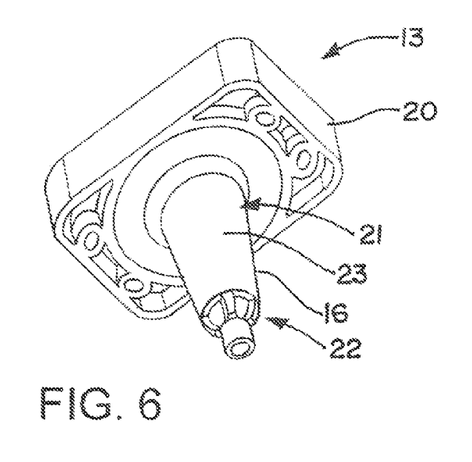
FIG. 6 is a perspective view of a swivel bracket of the wheel assembly of FIG. 4 looking angularly from the bottom side.
Figure 7:
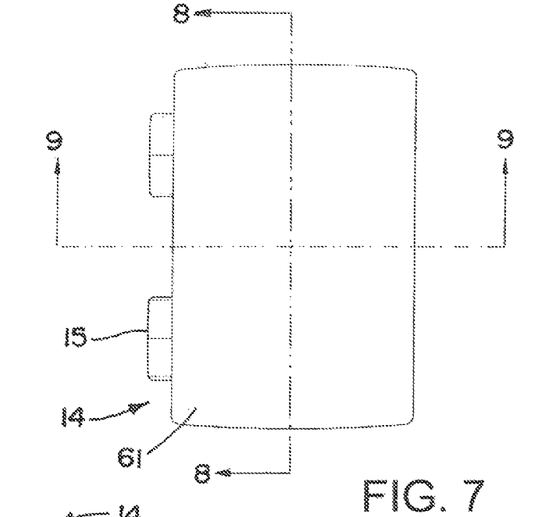
FIG. 7 is a top view of the wheel assembly of FIG. 4.

As is illustrated in FIGS. 4 and 6, the spindle 16 extends linearly, e.g., along a linear axis A, from a main body 20 of the swivel bracket 13. The axis A sometimes is referred to herein as the spindle axis or swivel axis. The spindle has a proximal end portion 21 that is relatively proximate, near or at the main body 20 and the spindle extends from the main body 20. The spindle also has a distal end portion 22 that is remote from the main body 20 relative to the proximal end portion. The main body may provide a support base for the spindle. The spindle has a portion 23 that is of generally truncated conical shape having a generally circular cross-section over at least part of its length, such cross-section tapering or narrowing at an angle or camber such that it is wider or larger near the proximal end portion 21 and relatively narrower or smaller nearer the distal end portion 22. In the illustrated embodiment, the angle or camber of the taper is generally smooth and continuous.

The spindle 16 is configured to extend into the wheel bracket 12, as is described further below. A retainer mechanism 24 at the distal end portion 22 of the spindle is configured to retain the spindle in the wheel bracket 12 while permitting the wheel bracket to swivel about the spindle relative to the swivel bracket 13; thus, the swivel bracket and wheel bracket swivel or rotate relative to each other about the axis A.

Figure 8:
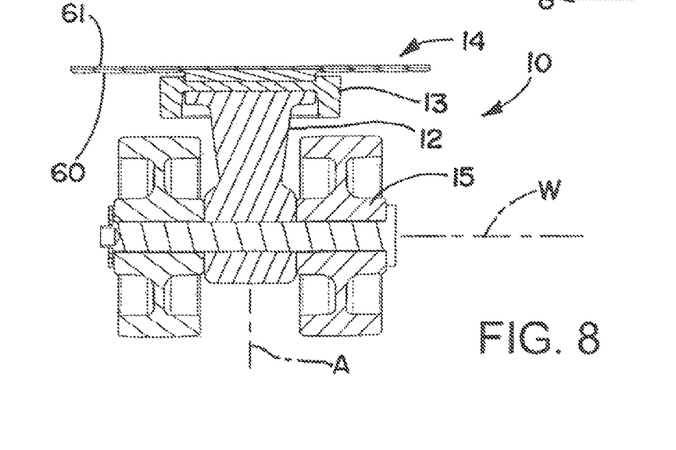
FIG. 8 is a section view of the wheel assembly looking in the direction of the arrows 8-8 of FIG. 7.
Figure 9A:
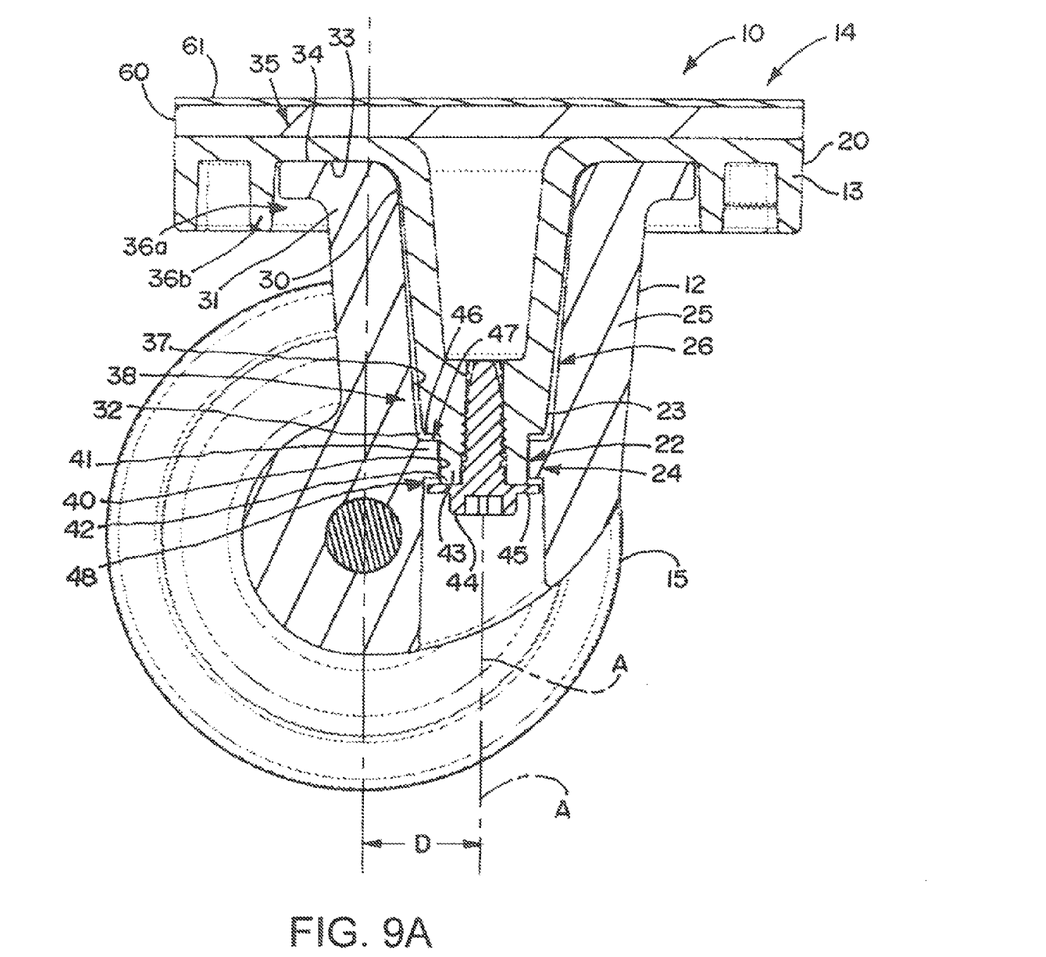
FIG. 9A is a section view of the wheel assembly looking in the direction of the arrows 9-9 of FIG. 7.
Figure 9B:
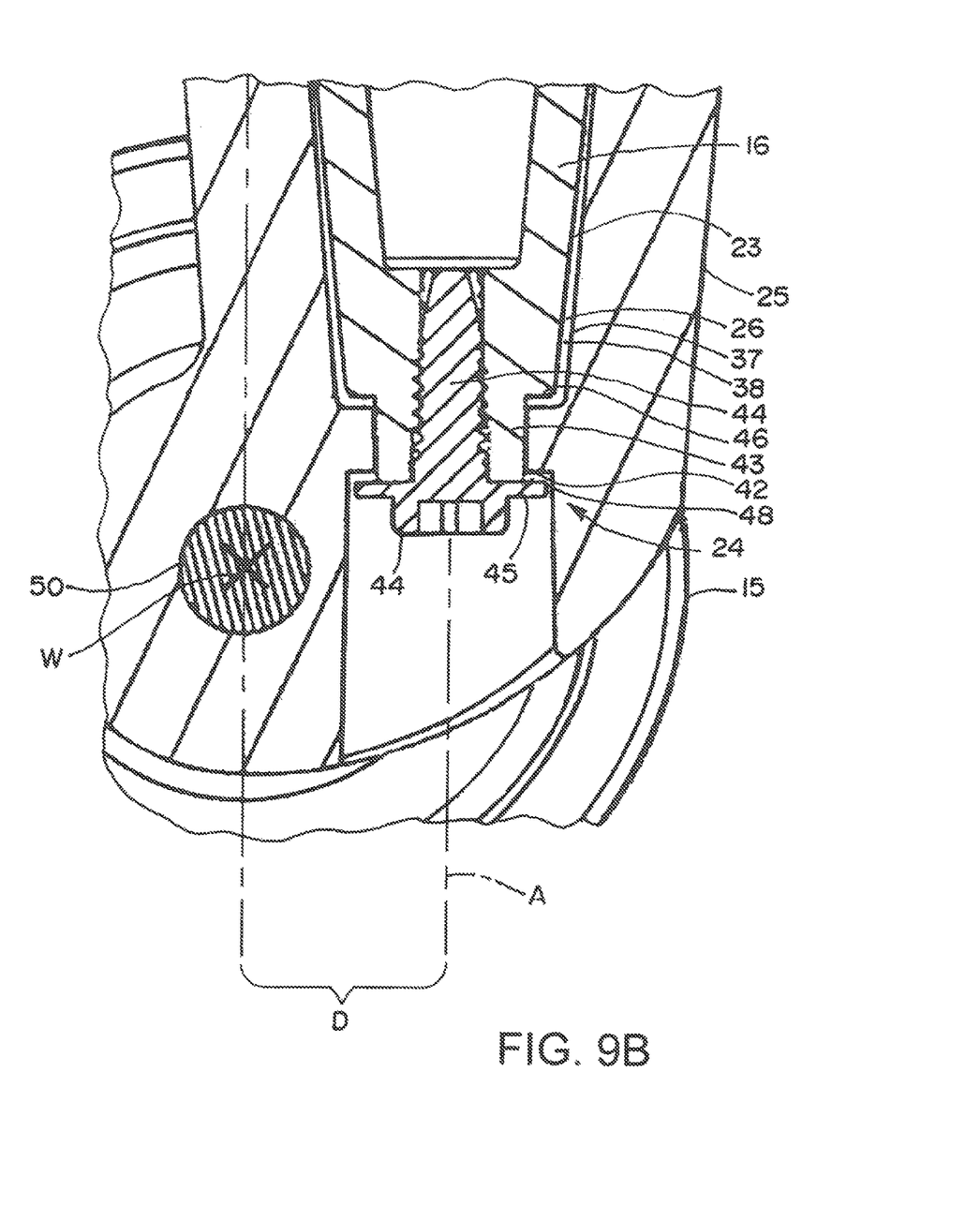
FIG. 9B is an enlargement of a portion of FIG. 9A—reference below to FIG. 9 includes both FIGS. 9A and 9B or a respective one if the mentioned part is not shown in the given FIG. 9A or 9B.
Figure 10:
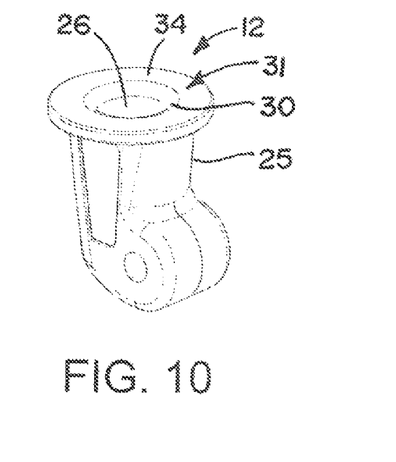
FIG. 10 is a perspective view of the wheel bracket looking angularly from the top.
Figure 11:
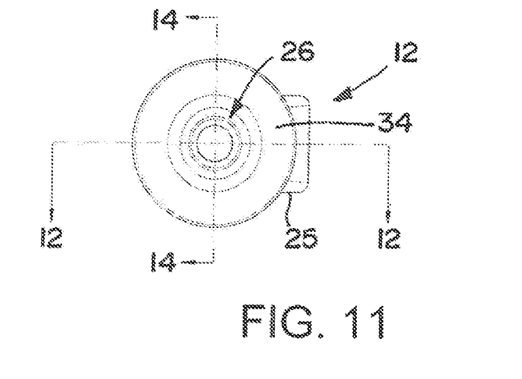
FIG. 11 is a top view of the wheel bracket.
Figure 12:
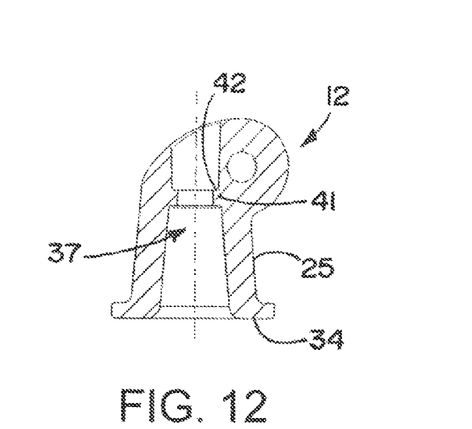
FIG. 12 is a side section view of the wheel bracket looking in the direction of the arrows 12-12 of FIG. 11.
Figure 13:
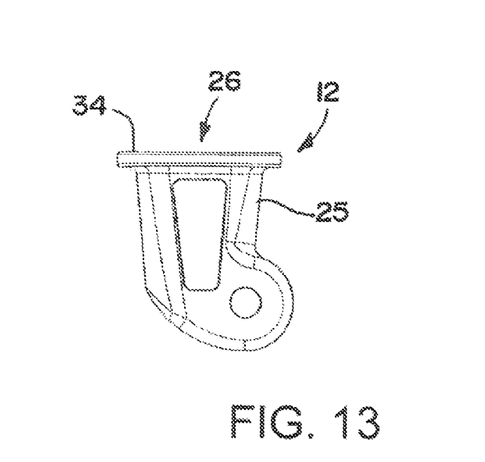
FIG. 13 is a side elevation view of the wheel bracket.
Figure 14:
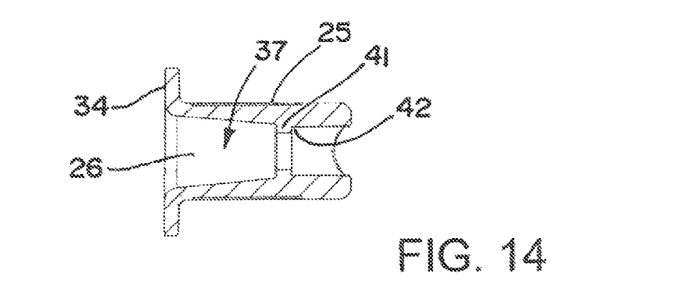
FIG. 14 is a side section view of the wheel bracket looking in the direction of the arrows 14-14 of FIG. 11.
Figure 15:
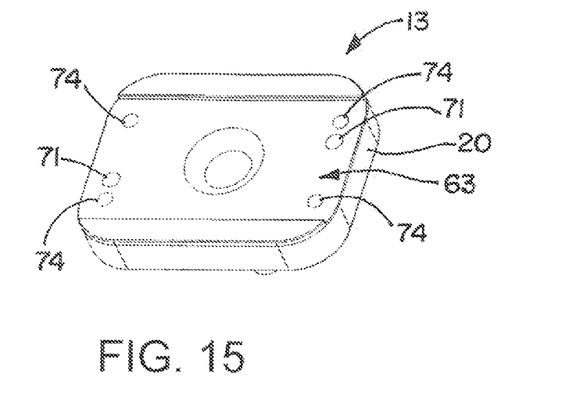
FIG. 15 is a perspective view of the swivel bracket looking angularly from the top.
Figure 16:
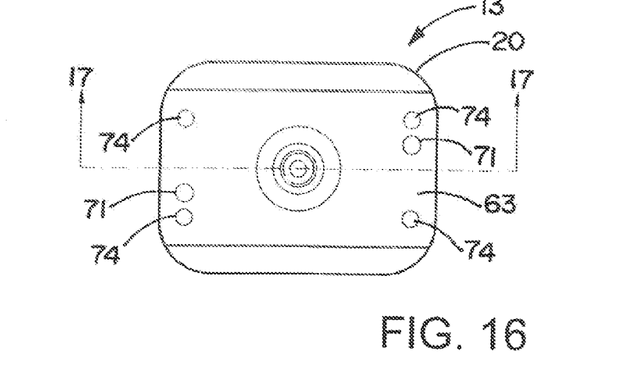
FIG. 16 is a top view of the swivel bracket.
Figure 17:
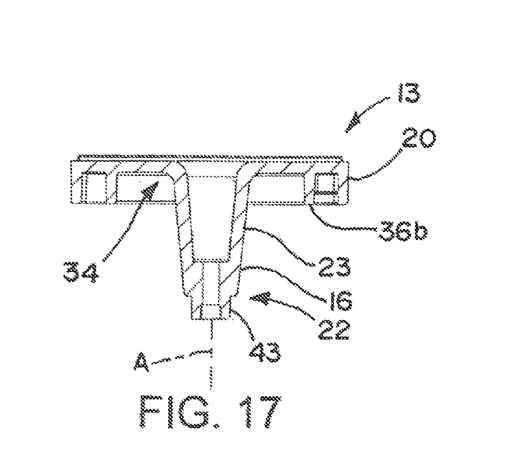
FIG. 17 is a side elevation section view of the swivel bracket looking in the direction of the arrows 17-17 in FIG. 16.
Figure 18:
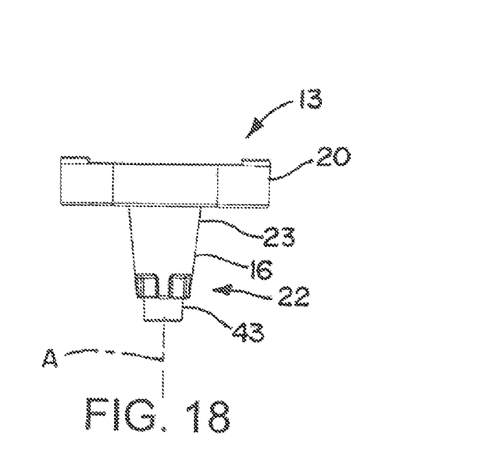
FIG. 18 is a side elevation view of the swivel bracket showing the recess for receiving the adhesive bracket.

The wheel bracket 12 includes a main body 25 and a passage 26 in the main body, the passage being in sense a receptacle for the spindle 16 in which the spindle extends. Thus, the passage 26 in a sense is a mating receptacle for the spindle 16. The passage 26 has an entrance 30 at one end 31 (also sometimes referred to as the proximal end) and has a distal end 32. At the entrance 30 a surface 33 of the swivel bracket 13 and a surface 34 of the wheel bracket 12 face each other and at least partially engage each other providing a thrust bearing 35 for the wheel assembly 10 when the wheel assembly is loaded in use, e.g., as is illustrated in FIG. 3. The surfaces forming the thrust bearing 35 respectively circumscribe the spindle 16 and circumscribe the entrance 30 into passage 26; and those surfaces are smooth and conform shape-wise to each other to facilitate swiveling of the wheel assembly 10 while providing a load support function of the wheel assembly. As is seen in FIGS. 6, 8 and 9, for example, a recess or space 36a is bounded by a raised surface portion, rim or wall 36b and by a wall of the spindle 16; the wall 36b guides and confines the surface 34 of the wheel bracket in the space 36a at the thrust bearing 35. The wall 36b also tends to block dirt or other contaminating particles from entering the area of the thrust bearing 35 to avoid interfering with swiveling of the wheel assembly.

The passage 26 has a passage portion 37 that is of a conical shape generally corresponding to the truncated conical shape of the conical portion 23 of the spindle 16 that is inserted in the passage 26. However, the angle or camber of taper of the conical shape passage portion 37 is less sharp or steep, e.g., a smaller angle of taper than the angle or camber of taper of the conical portion 23 of the spindle 16. Such shape relation of the spindle 16 and passage 26 tends to leave a space or gap 38 between walls of the spindle and passage. Thus, while the at least part of the surfaces 33, 34 at the thrust bearing 35 bear against each other, the tapered conical portion 23 of the spindle tends to be spaced from the surrounding wall of the passage 26 so as to minimize frictional surface to surface engagement between the spindle and passage wall, thus facilitating the swiveling described herein. In the illustrated embodiment the tapered conical portion 23 is substantially smoothly tapered maintaining a substantially constant angle of taper along the tapered conical portion. In the illustrated embodiment the conical shape passage portion 37 also is substantially smoothly tapered maintaining a constant angle of taper along the conical shape passage portion.

Figure 23:
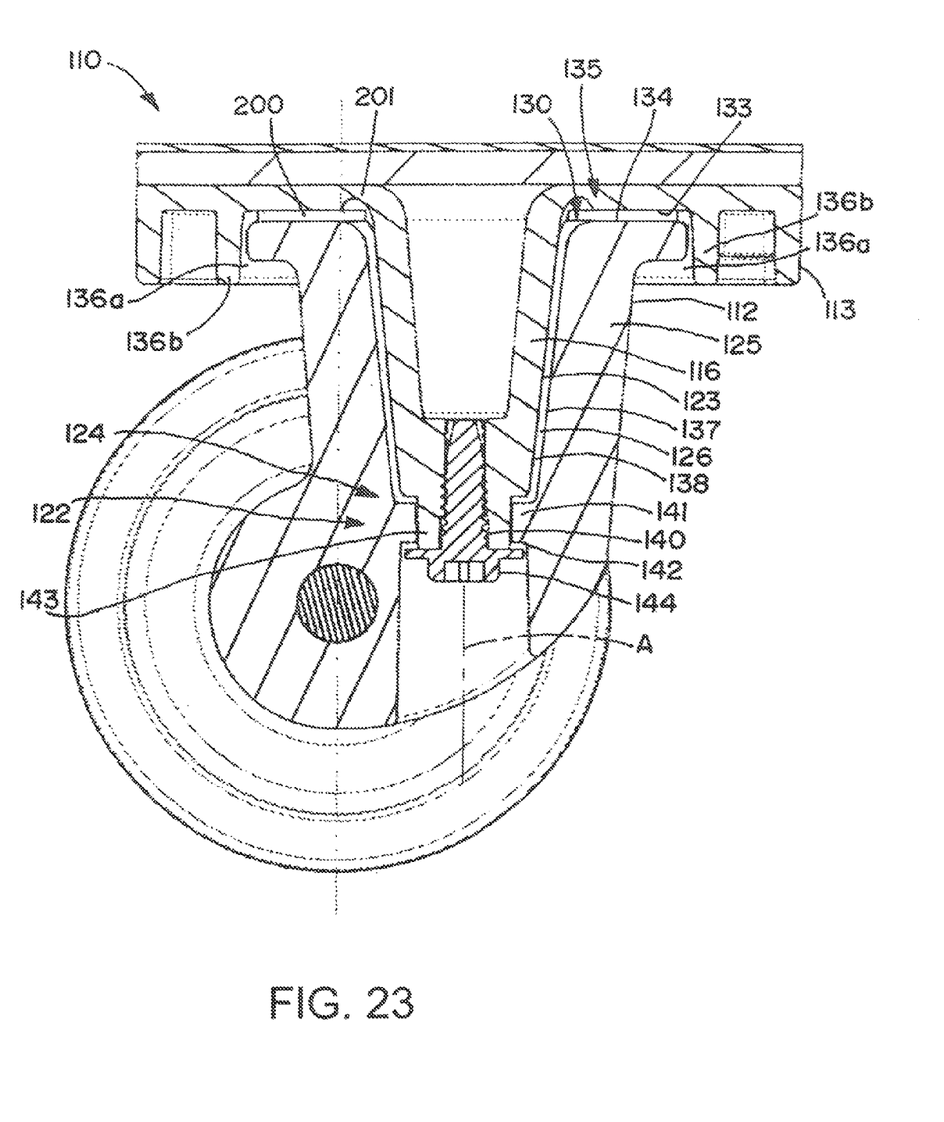
FIG. 23 is a section view of another embodiment of wheel assembly looking generally in a direction similar to the direction of the arrows 9-9 of FIG. 8, to provide a viewing reference, but not otherwise necessarily corresponding to FIG. 8.

If desired, as is illustrated in FIG. 23 with respect to wheel assembly 110, which is described below, the tapers of the conical portion 23 of the spindle 16 and the conical wall portion of the passage portion 37 of the passage 26 may be the same or substantially the same; but in such case the depth of insertion of the spindle into the passage may be controlled to maintain clearance between the surfaces of the respective surfaces of the conical spindle portion 23 and the conical passage portion 37. An exemplary minimum clearance between such surfaces for both wheel assemblies 10, 110 may be 0.003 inch, although other clearance dimensions may be used.

Passage 26 in the main body 25 of the wheel bracket 12 includes a cylindrical opening portion 40 of uniform or substantially uniform circular cross section that extends through a stop member 41 and terminates at a stop surface 42 at the distal side of the stop member relative to the entrance 30. The distal end 22 of the spindle 16 includes an end portion 43 that is cylindrical and of uniform or substantially uniform circular cross section that passes through the cylindrical opening portion 40 beyond the stop surface 42. The walls surrounding the cylindrical opening portion 40 in the stop member 41 cooperate with the cylindrical end portion 43 of the spindle 16 to tend to align the spindle generally centrally in the passage 26 along the axis A while permitting relative rotation of the spindle in the passage and, thus, the relative rotation or swiveling of the wheel bracket 12 and swivel bracket 13.

The thrust bearing 35 between the swivel bracket and wheel bracket also assists to tend to align the wheel bracket 12 and spindle bracket 13 while also transferring force between the brackets.

The retention mechanism 24 includes the stop member 41, the stop surface 42 and a fastener 44, which is attached to the distal end 22 of the spindle 16 to block withdrawal of the spindle 16 from the passage 26. The fastener 44, e.g., a screw, holds the wheel bracket 12 and the swivel bracket 13 together. In the illustrated embodiment the fastener is a screw that is threaded into the end of the spindle. The screw 44 may be a self-tapping screw for convenience of installation screwing it into the distal end 22 of the spindle 16. The screw 44, for example, has a screw head 45 that is sufficiently larger than the diameter of the cylindrical opening portion 40 so as to engage the stop surface 42 to prevent being pulled through the cylindrical opening portion 40. Alternatively the fastener 44 may be a screw with a washer or similar member that prevents being pulled through the cylindrical opening portion 40. Other types of fasteners may be used, such as those that compress for insertion through the cylindrical opening portion 40 and then expand after insertion to prevent withdrawal.

As is seen in FIG. 9, the distal end of the cylindrical end portion 43 of the spindle 16 extends out from the cylindrical opening portion 40 of the stop member 41 beyond the stop surface 42. The surface of the large screw head of the fastener 44 is engaged with the distal end of the cylindrical end portion 43. However, if a force tending to withdraw the spindle 16 from the passage 26 were applied to the spindle, e.g., tending to pull the wheel bracket 12 and the swivel bracket 13 of the wheel assembly 10 apart, the large head 45 would engage the stop surface 42 preventing taking apart the wheel assembly.

In FIG. 9 the wheel assembly 10 is illustrated as though it were loaded, e.g., with the weight of the article 11 (cabinet, for example) bearing down on the mounting structure 14 urging the swivel bracket 13 toward the wheel bracket 12. Therefore, at least portions of the surfaces 33, 34 are engaged to provide function of thrust bearing 35. The distal end of the cylindrical end portion 43 of the spindle 16 extends beyond the stop surface 42, and the screw head 45 is spaced apart from the stop surface. The thrust bearing 35 tends to hold the spindle 16 so that end wall 46 of the truncated conical portion 23 of the spindle 16 is spaced from the stop member 41 leaving a space 47. However, if the mounting structure 14 and wheel assembly 10 is not loaded, it is possible for the swivel bracket 13 to undergo limited movement, e.g., along the spindle axis A, in an upward direction (relative to the illustration in the drawing) relative to the wheel bracket 12; the extent of such limited movement is restricted to the length of the space or gap 48 between the stop surface 42 and the screw head 45, for example.

The space 38 between the truncated conical portion 23 of the spindle and the truncated conical wall of the conical passage portion 37 of the wheel bracket, the space 47 between the end wall 46 of the truncated conical portion 23 of the spindle 16 and the stop member 41, and the space 48 between the screw head 45 and the stop surface 42 avoid causing friction between these wheel bracket parts and swivel bracket parts that would interfere with swiveling. The cooperative surfaces 33, 34 of the thrust bearing 35 and the cooperative relation between the cylindrical opening portion in the stop member and the cylindrical end portion 43 of the spindle 16 tend to hold the spindle 16 and passage 26 in alignment as described to facilitate such swiveling. Moreover, the parts of the wheel assembly, e.g., the wheel bracket 12 and the swivel bracket 13, may be made of sufficiently strong material to accomplish the functions of the wheel assembly 10 to support an article 11 while permitting rolling and swiveling, and such parts also may be made of relatively low friction materials.

Non-limiting examples of such relatively low friction and strong materials include a Delrin® material, acetyl homopolymers, polyacetyl materials, polyformaldehyde materials, ABS (Acrylonitrile Butadiene Styrene plastic), Nylon®, POM (polyoxymethelyne, PTFE, Teflon® material, high density high molecular weight polyethylene, and so on. Other materials may be used. The adhesive bracket 60, described further below, may be made of polypropylene for flexibility. In an embodiment the materials can be injection molded to make the parts of the wheel assembly 10, and have relatively high stiffness, low friction and dimensional stability as finished parts. Also, the tapered configuration of at least part of the spindle and passage into which it fits facilitates manufacturing of the respective wheel bracket and swivel bracket.

As is seen in FIG. 4, two wheels 15 are mounted on opposite sides of the wheel bracket 12 using an axle 50. The axle 50 may be a rivet having a head 51 at one end and at the other end a securement portion 52 that may be flared out, peened, flared out, expanded or otherwise deformed. Such a rivet may be referred to as a shoulder rivet. A washer 53 may be located between the securement portion 52 and a wheel 15. The rivet head 51 and securement portion 52 secure the wheels to the rivet mounted on the wheel bracket. A screw, bolt or other member may be used for mounting the wheels on the wheel bracket. Alternatively, the wheel bracket may be formed with integral protruding axle-like members onto which the wheels may be mounted. The rivet head 51 and securement portion 52 hold the wheels on the axle formed by the rivet so the wheels may roll about the axle. As is seen in FIG. 5, the wheels 15 include stand-offs 54 to space the wheels from the main body of the wheel bracket to minimize rubbing by the wheels against the main body. The stand-offs 54 act as thrust bearings between respective wheels and the wheel bracket 12.

As is seen most clearly in FIGS. 4, 8 and 9, the spindle 16 extends along a generally linear spindle axis A, and the two wheels are mounted on the axle 50 that extends along a generally linear wheel axis W. Relative to the spindle axis A, the wheel bracket may rotate or swivel. Relative to the wheel axis W, the wheels may rotate or roll. The wheel axis is generally perpendicular to the spindle axis; and the wheel axis is spaced apart or offset from the spindle axis so as not to intersect the spindle axis. The offset is shown at D in FIG. 9. Therefore, the wheels are offset from the spindle axis A and on opposite sides of the spindle axis. In this structure, the wheels 15 may roll in a forward or backward direction if a force is applied to the wheel assembly in a direction that is perpendicular to the wheel axis W. However, if a force is applied to the wheels in a direction that is other than perpendicular to the wheel axis W, the mentioned offset of the axes A and W so they do not intersect, lead to a mechanical couple being applied by the wheels 15 about the swivel axis A, causing a torque applied to the wheel bracket 12 tending to cause the wheel bracket automatically to swivel about the spindle of the swivel bracket 13. The wheel assembly has no stops that limit the amount of rotation about the swivel axis A; thus, the swiveling or rotation of the wheel bracket 12 may be a full 360 degrees about the spindle 16.

The wheel bracket 12 is shown in several views in FIGS. 10-14. The various parts in these figures are described above by reference numeral with respect to FIGS. 1-9.

The swivel bracket 13 is shown in several views in FIGS. 15-18. The various parts in these figures are described above by reference numeral with respect to FIGS. 1-9.

In FIGS. 1-4, 7-9 and 16-22 the mounting structure 14 is shown. The mounting structure is provided for mounting the wheel assembly 10 to an article 11 for support by the wheel assembly. The mounting structure 14 includes an adhesive bracket 60 coupled to the swivel bracket and an adhesive attachment 61 coupled to the adhesive bracket and configured to adhere the wheel assembly 10 to an article. The adhesive attachment may be a foam based adhesive manufactured by Avery Denison Corporation, an example being acrylic foam bond (AFB) material.

Figure 19:
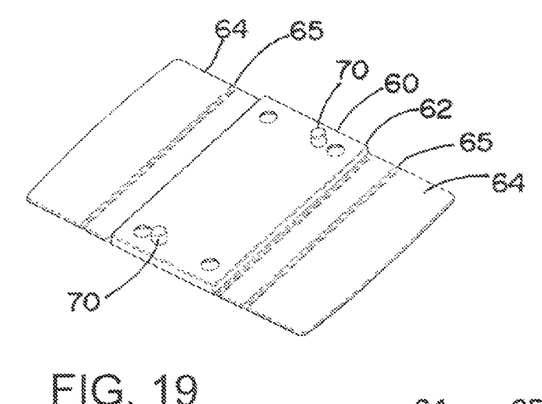
FIG. 19 is a perspective view of the adhesive bracket looking toward the bottom from a side.
Figure 20:
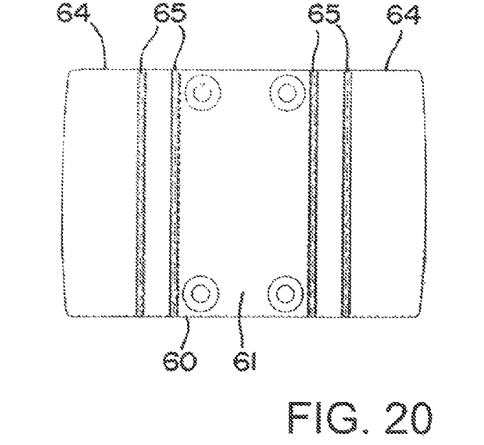
FIG. 20 is a bottom plan view of the adhesive bracket.
Figure 21:
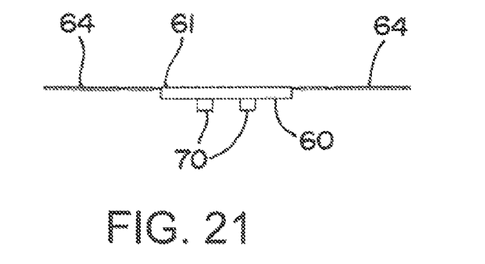
FIGS. 21 and 22 are respective side edge elevation views of the adhesive bracket looking toward different respective side edges.
Figure 22:
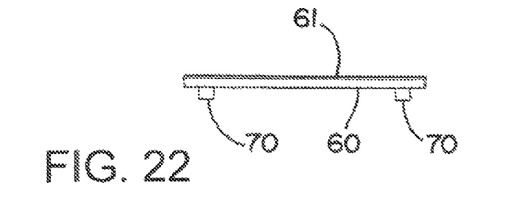

The adhesive bracket 60 includes a relatively thick coupling base 62 that is configured to fit in a stepped recess 63 in the top surface of the main body 20 of the swivel bracket 13. The recess 63 guides the adhesive bracket to fit securely in the main body 20 of the swivel bracket 13. Wings 64 extend out from the coupling base 62. The wings and coupling base may be the same material, but the wings may be more flexible than the coupling base in that they are thinner than the coupling base. The wings are deformable, e.g., they may be made of suitable flexible material, so that they can be bent to engage a side surface of an article, e.g., as is shown at article 11 in FIG. 3. Scroll lines or bend lines 65, e.g., recesses, may be formed in the surface of the wings, e.g., as illustrated in FIGS. 19 and 20, to facilitate bending of a wing into engagement with a side surface of an article, as mentioned.

An alignment guide mechanism facilitates proper and secure positioning of the adhesive bracket 60 on the main body 20 of the swivel bracket 13. The alignment guide includes a pair of protruding tabs 70 of the coupling base 62 that are in off-set relation on the coupling base to fit in corresponding positioning or locator openings 71 in the top surface of the main body 20 when the coupling base is properly positioned in the recess 63. A number of screws 73 (shown in FIG. 4) may be positioned in holes 72 in the coupling base 62 and secured in holes 74 in the main body 20 of the swivel bracket to hold the adhesive bracket 60 to the swivel bracket. Alternatively, the coupling base 62 may be attached to the main body 20 of the swivel bracket using heat staking technique, e.g., with heat stakes secured in one or more of the holes 74.

An adhesive member 61 (also referred to above as adhesive attachment) is at the top surface of the adhesive bracket 60. The adhesive member may be a support sheet that has an adhesive layer of material on both surfaces. A liner may cover each adhesive layer to protect the adhesive material. The liner may be removed from one adhesive layer and the adhesive member may be pressed against the adhesive bracket to adhere the adhesive bracket and adhesive member together.

To use the wheel assembly 10, the remaining liner covering the adhesive layer may be removed and the wheel assembly attached to an article, e.g., as shown attached to article 11 of FIG. 3. The adhesive may be pressed against virtually any surface of the article. For example, the wheel assembly 10 may be pressed against the bottom surface of an article with both wings of the support surface engaged with that bottom surface. Alternatively, as is illustrated in FIG. 3, the wheel assembly may be attached to both the bottom surface of the article and to a side surface, whereby one of the wings is folded up to attach to the side surface while the other wing remains unfolded and attaches to the bottom surface. If desired, the wheel assembly 10 also may be attached to another surface, e.g., to a side of an article to locate the wheel assembly between the article and a wall to facilitate moving the article along the wall without a surface of the article rubbing against the wall.

The wheel assembly 10 may be made by manufacturing the respective parts, such as the wheel bracket 12, support bracket 13, mounting structure 14 and wheels 15 using conventional techniques, for example, plastic injection molding may be used. The adhesive attachment 61 may be stuck on the adhesive bracket 60 and the axle 50 may be inserted into the wheel bracket and have the wheels 15 thereon. Since there are relatively few parts, and since plastic injection molding is a reliable process to produce reproducible parts, the wheel assemblies may be quite standardized as the same both in configuration, in reliability and in use characteristics, such as similar forces and torques to provide for rolling and/or swiveling functions.

Turning to FIG. 23, another embodiment of wheel assembly 110 is illustrated. In FIG. 23 parts that are similar to those described above with respect to the wheel assembly 10 are designated by the same reference numeral but increased by 100.

The wheel assembly 110 is similar to the wheel assembly 10; however, the angle or camber of taper of the conical portion 123 of the spindle 116 and the angle or camber of taper of the truncated conical shape portion 137 of the passage 126 are the same or are nearly the same. Additional features of the wheel assembly 110 are described below. Such shape relation of the spindle 116 and passage 126 and the relative positioning of the spindle and passage including the below mentioned additional features tend to leave a space or gap 138 between walls of the spindle and passage. Thus, while the at least part of the surfaces 133, 134 at the thrust bearing 135 bear against each other, the tapered conical portion 123 of the spindle 116 tends to be spaced from the surrounding wall of the passage 126 so as to minimize frictional surface to surface engagement between the spindle and passage wall, thus facilitating the swiveling described herein.

As is described above, passage 126 in the main body 125 of the wheel bracket 112 includes a cylindrical opening portion 140 of circular cross section that extends through a stop member 141 and terminates at a stop surface 142 at the distal side of the stop member relative to the entrance 130. The distal end 122 of the spindle 116 includes an end portion 143 that is cylindrical and of circular cross section that passes through the cylindrical opening portion 140 beyond the stop surface 142. The walls surrounding the cylindrical opening portion 140 in the stop member 141 cooperate with the cylindrical end portion 143 of the spindle 116 to tend to align the spindle generally centrally in the passage 126 along the axis A while permitting relative rotation of the spindle in the passage and, thus, the relative rotation or swiveling of the wheel bracket 112 and swivel bracket 113.

The thrust bearing 135 between the swivel bracket and wheel bracket also assists to tend to align the wheel bracket 112 and spindle bracket 113 while also transfer force between the brackets. If desired, a spacer 200, e.g., a washer of Teflon® material or of other suitably strong and slick or slippery material, may be included in the thrust bearing 135 between the respective surfaces 133, 134 thereof. The spacer may facilitate swiveling and/or may help to align and/or to space the wheel bracket 112 and swivel bracket 113, e.g., to provide for the desired spacing of parts at the retention mechanism 124.

The retention mechanism 124 and the thrust bearing 135 limit the axial distance that the wheel bracket 112 and swivel bracket 113 can move relative to each other, e.g., along the axis of the spindle 116 and passage 126. By so limiting such relative axial movement, spacing of the spindle 116 and passage 126 would be maintained, thereby tending to avoid surface to surface contact of the spindle and passage and avoiding rubbing or frictional engagement of the spindle along the passage. As is illustrated, the retention mechanism 124 is the same or substantially the same as the retention mechanism 24, which is described above, and includes the stop member 141, the stop surface 142 and a fastener 144, which is attached to the distal end 122 of the spindle 116 to block withdrawal of the spindle 116 from the passage 126. Thus, as is described above, the retention mechanism limits the distance that the spindle 116 of the swivel bracket 113 and, therefore, the swivel bracket 113, can be moved upward (relative to the illustration of FIG. 23) in the passage 126 away from the wheel bracket 112. Also, as is described above, thrust bearing 135 limits the distance that the spindle 116 and swivel bracket 113 can be moved downward (relative to the illustration of FIG. 23) toward the wheel bracket 112.

As is seen in FIG. 23, the distal end of the cylindrical end portion 143 of the spindle 116 extends out from the cylindrical opening portion 140 of the stop member 141 beyond the stop surface 142. The surface of the large screw head of the fastener 144, for example, is engaged with the distal end of the cylindrical end portion 143. However, if a force tending to withdraw the spindle 116 from the passage 126 were applied to the spindle, e.g., tending to pull the wheel bracket 112 and the swivel bracket 113 of the wheel assembly 110 apart, the large head 145 would engage the stop surface 142 preventing taking apart the wheel assembly.

In FIG. 23 the wheel assembly 110 is illustrated as though it were loaded, e.g., with the weight of the article 11 (cabinet, for example) bearing down on the mounting structure 114 urging the swivel bracket 113 toward the wheel bracket 112. Therefore, at least portions of the surfaces 133, 134 are engaged to provide function of thrust bearing 135. The optional spacer 200, e.g., a Teflon® washer, may be provided to space apart respective surfaces of the thrust bearing 135. The spacer 200 may be eliminated in which case the respective surfaces of the thrust bearing 135 may directly engage each other, as was described above with regard to the thrust bearing 35.

With regard to the thrust bearing 135, a relief groove or recess 201 may be provided at the inner circumference of the thrust bearing surface 133 and, thus, circumferentially about the spindle 116, as is illustrated in FIG. 23. The recess 201 may be formed as a counter-bore in the surface of the swivel bracket 113, as is illustrated. The relief groove 201 helps to minimize friction or to minimize a concentration of frictional forces between the swivel bracket and the wheel bracket in the area of the inner perimeter of the thrust bearing 135. The relief groove helps to assure that force, which is caused by the weight of an object 11 supported by the wheel assembly 110, is substantially uniformly distributed over the face-to-face engaged surfaces of the 133, 134 of the thrust bearing 135 or via the spacer 200, if the spacer is used.

As was described above with respect to the raised rim or wall 136b, such wall guides and confines the surface 134 of the wheel bracket in the space 136a at the thrust bearing 135. The wall 136b also tends to block dirt or other contaminating particles from entering the area of the thrust bearing 135 to avoid interfering with swiveling of the wheel assembly.

In operation both wheel assemblies 10, 110 function to support an object 11 (FIG. 3). The wheel assemblies may be attached to the object to support the object. With the object supported on wheel assemblies, the object may be moved in all directions as the wheels 15 roll and as respective wheel brackets 12 with wheels thereon swivel with respect to the swivel brackets 13 to allow for moving the object in all directions.

Although a particular preferred embodiment or embodiments have been shown and the present disclosure has been described, it is understood that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the a particular feature of the present disclosure is described with respect to only one or more of the illustrated embodiments, such a feature may be combined with one or more other features of other embodiments as desired and in consideration of advantageous aspects of any given or particular application.

We claim:

1. A wheel assembly, comprising
   at least two wheels,
   a wheel bracket configured for mounting two or more wheels with respect thereto,
   a swivel bracket configured for positioning with respect to an object with respect to which the wheel assembly is used,
   the swivel bracket including a main body and a spindle extending from one side of the main body of the swivel bracket,
      the spindle having a proximal end portion and a distal end portion,
      the proximal end portion relatively proximate the main body of the swivel bracket and the distal end portion being remote from the main body relative to the proximal end portion,
      the spindle configured to extend into the wheel bracket, and
   a retention mechanism at the distal end portion of the spindle configured to retain the spindle in the wheel bracket while permitting the wheel bracket to swivel about the spindle relative to the swivel bracket,
   wherein the spindle extends along a generally linear spindle axis, and wherein two of the wheels are spaced apart along a wheel axis that is generally perpendicular to the spindle axis and that is spaced apart from the spindle axis as not to intersect the spindle axis, and wherein the wheels, respectively, are on opposite sides of the spindle axis, and
   wherein the spindle extends generally linearly from the main body of the swivel bracket along a generally linear spindle axis, and the retention mechanism is configured to retain the spindle in the wheel bracket while permitting limited movement of the spindle in a direction along the spindle axis.

2. The wheel assembly of claim 1, further comprising a mounting structure for mounting the wheel assembly to an article for support by the wheel assembly.

3. The wheel assembly of claim 2, wherein the mounting structure comprises an adhesive bracket coupled to the swivel bracket, and adhesive attachment coupled to the adhesive bracket and configured to adhere the wheel assembly to an article.

4. The wheel assembly of claim 1, further comprising an axle supported by the wheel bracket, the wheels being mounted on the axle.

5. The wheel assembly of claim 1, wherein the wheel bracket includes a main body and a passage in the main body in which the spindle extends, and wherein the passage has an entrance at one end and has a distal end, and the passage further having a stop configured to cooperate with a retainer of the retention mechanism to retain the spindle in the wheel bracket.

6. The wheel assembly of claim 5, wherein the passage includes a portion that extends through the stop member, wherein the distal end portion of the spindle extends through and beyond the stop member, wherein the stop member has a stop surface at the distal side of the stop relative to the entrance of the passage, and wherein the retainer is configured for attachment to the distal end of the spindle in position for interference with the stop surface to block the spindle from being withdrawn from the passage.

7. The wheel assembly of claim 6, further comprising a mounting structure for mounting the wheel assembly to an article for support by the wheel assembly, and wherein in response to loading of the wheel assembly at the mounting structure urging the swivel bracket toward the wheel bracket, the retainer is urged toward but in spaced relation relative to the stop surface avoiding interference with swiveling of the wheel bracket relative to the swivel bracket.

8. The wheel assembly of claim 1, further comprising a thrust bearing between the wheel bracket and the swivel bracket configured to facilitate swiveling of the wheel bracket relative to the spindle and swivel bracket when the wheel bracket and swivel bracket are urged toward each other in response to loading of the wheel assembly.

9. A wheel assembly, comprising
at least one wheel,
a wheel bracket configured for mounting one or more wheels with respect thereto,
a swivel bracket configured for positioning with respect to an object with respect to which the wheel assembly is used,
the swivel bracket including a main body and a spindle extending from one side of the main body of the swivel bracket,
the spindle having a proximal end portion and a distal end portion,
the proximal end portion relatively proximate the main body of the swivel bracket and the distal end portion being remote from the main body relative to the proximal end portion,
the spindle configured to extend into the wheel bracket, and
a retention mechanism at the distal end portion of the spindle configured to retain the spindle in the wheel bracket while permitting the wheel bracket to swivel about the spindle relative to the swivel bracket,
further comprising a thrust bearing between the wheel bracket and the swivel bracket configured to facilitate swiveling of the wheel bracket relative to the spindle and swivel bracket when the wheel bracket and swivel bracket are urged toward each other in response to loading of the wheel assembly, and
wherein the wheel bracket includes a main body and a passage having an entrance end and a distal end, the spindle extending in the passage from the entrance end toward the distal end of the passage, and the thrust bearing comprises a smooth surface of the wheel bracket main body about the entrance end and a smooth surface of the swivel bracket about the spindle, and wherein the respective smooth surfaces face each other.

10. The wheel assembly of claim 9, further comprising a surface surrounding at least part of the thrust bearing to block contaminant from entering the thrust bearing.

11. The wheel assembly of claim 9, the passage further having a stop configured to cooperate with a retainer of said retention mechanism to retain the spindle in the wheel bracket, wherein the passage includes a portion that extends through the stop and the spindle is rotatable in the portion, wherein the distal end of the spindle extends through and beyond the stop, wherein the stop has a stop surface at the distal side of the stop relative to the entrance of the passage, and wherein the retainer is configured for attachment to the distal end of the spindle in position for interference with the stop surface to block the spindle from being withdrawn from the passage while permitting limited movement of the spindle in a direction along an axis of the spindle.

12. The wheel assembly of claim 11, wherein the retainer is configured to retain the spindle bracket and wheel bracket together with the respective smooth surfaces aligned with each other to provide a thrust bearing function.

13. A wheel assembly, comprising
at least one wheel,
a wheel bracket configured for mounting one or more wheels with respect thereto,
a swivel bracket configured for positioning with respect to an object with respect to which the wheel assembly is used,
the swivel bracket including a main body and a spindle extending from one side of the main body of the swivel bracket,
the spindle having a proximal end portion and a distal end portion,
the proximal end portion relatively proximate the main body of the swivel bracket and the distal end portion being remote from the main body relative to the proximal end portion,
the spindle configured to extend into the wheel bracket, and
a retention mechanism at the distal end portion of the spindle configured to retain the spindle in the wheel bracket while permitting the wheel bracket to swivel about the spindle relative to the swivel bracket,
the spindle having at least a portion that is generally tapering truncated conical shape, and
the wheel bracket having a receptacle that is of gradually tapering truncated conical shape different from that of the spindle, and is configured to receive at least part of the spindle,
whereby with the spindle inserted in the receptacle corresponding portions of the spindle and receptacle are in closer fitting relation relatively near the proximal end portion of the spindle than corresponding other parts of the spindle and receptacle that are relatively near the distal end of the respective tapered portions thereof.

14. A wheel assembly, comprising
at least one wheel,
a wheel bracket configured for mounting one or more wheels with respect thereto,
a swivel bracket configured for positioning with respect to an object with respect to which the wheel assembly is used,
the swivel bracket including a main body and a spindle extending from one side of the main body of the swivel bracket,
the spindle having a proximal end portion and a distal end portion,
the proximal end portion relatively proximate the main body of the swivel bracket and the distal end portion being remote from the main body relative to the proximal end portion, the spindle configured to extend into the wheel bracket, and a retention mechanism at the distal end portion of the spindle configured to retain the spindle in the wheel bracket while permitting the wheel bracket to swivel about the spindle relative to the swivel bracket, wherein the wheel bracket includes a receptacle configured to receive therein at least part of the spindle, wherein at least part of the spindle that is in the receptacle is of truncated conical tapered configuration and at least part of the receptacle is of truncated conical configuration, and further comprising a thrust bearing and a stop that are cooperative with the wheel bracket and swivel bracket to limit relative movement of the wheel bracket and spindle bracket to maintain spaced relation between the respective truncated conical tapered portions of the spindle and receptacle.

15. A swivelable wheel assembly, comprising at least one wheel, a wheel bracket configured to support at least one wheel, a swivel bracket configured to support the wheel bracket, the swivel bracket including a base and an elongate spindle extending from the base, the elongate spindle having a generally circular cross section portion at least part of which is tapered from a relatively wider cross section toward a relatively narrower cross section remote from the base, the wheel bracket including a body having an elongate receptacle space therein to receive at least part of the elongate spindle, the receptacle space having a generally circular cross section portion at least part of which is tapered from a relatively wider cross section at the entrance to the elongate receptacle space where the elongate spindle is received in the elongate receptacle space toward the interior of the elongate receptacle away from the entrance, the angle of taper of the elongate spindle being sharper than the angle of taper of the elongate receptacle space as to tend to minimize surface contact between the tapered part of the elongate spindle and a wall of the elongate receptacle space adjacent the tapered part of the elongate spindle inserted in the elongate receptacle space, a retainer configured to retain the elongate spindle in the elongate receptacle space, and wherein a wall portion of the elongate spindle and a wall portion of the base of the swivel bracket engage each other.

16. The swivelable wheel assembly of claim 15, wherein the wheel bracket and swivel bracket have respective surfaces that are cooperative as a thrust bearing to distribute force between the wheel bracket and swivel bracket in response to force urging them together.

17. The swivelable wheel assembly of claim 15, wherein the at least one wheel comprises a pair of wheels supported by the wheel bracket, and further comprising a mounting assembly configured to attach the wheel assembly to an article for support by the swivelable wheel assembly and the wheels thereof, and wherein in response force of an article against the mounting assembly the swivel bracket and wheel bracket are urged together, and wherein the wheel bracket is rotatable relative to the swivel bracket about a swivel axis, and the pair of wheels are rotatable about a wheel axis that is perpendicular to the swivel axis, and wherein the wheel axis is spaced from in offset relation to the swivel axis so as not to intersect the swivel axis at the swivelable wheel assembly.

18. The swivelable wheel assembly of claim 17, wherein part of the spindle and part of receptacle engage at the entrance and there is no substantial surface to surface engagement of the tapered part of the spindle and the wall of the tapered receptacle spindle in use of the swivelable wheel assemble supporting an article via wheels of the swivelable wheel assembly.

19. A swivelable wheel assembly, including at least one wheel, a swivel bracket having a support base and an extending spindle, the spindle having a generally round cross section and a portion that is tapered from a relatively wider cross section toward a relatively narrower cross section from an area nearer the support base toward an area nearer the distal end of the spindle, and a wheel bracket having a receptacle extending in a direction and having an open area to receive at least part of the spindle, the open area of the receptacle that receives the spindle having a generally round cross section that is tapered from a relatively wider cross section near an entrance to receive the spindle into the open area toward a relatively narrower cross section portion, and wherein the swivel bracket and the wheel bracket are swivelable with respect to each other with the spindle in the receptacle, a retainer configured to retain the elongate spindle in the elongate receptacle space while permitting limited axial movement of the spindle and receptacle with respect to each other to tend to avoid surface to surface engagement of respective surfaces of the spindle and receptacle.

* * * * *